(12) United States Patent
Yoneda et al.

(10) Patent No.: US 8,114,797 B2
(45) Date of Patent: Feb. 14, 2012

(54) POLARIZING GLASS CONTAINING COPPER AND OPTICAL ISOLATOR

(75) Inventors: Yoshitaka Yoneda, Shinjuku-ku (JP); Sei-ichi Yokoyama, Shinjuku-ku (JP)

(73) Assignee: Hoya Candeo Optronics Corporation, Toda-Shi (JP)

(*) Notice: Subject to any disclaimer, the term of this patent is extended or adjusted under 35 U.S.C. 154(b) by 674 days.

(21) Appl. No.: 12/297,143

(22) PCT Filed: Apr. 12, 2007

(86) PCT No.: PCT/JP2007/058101
§ 371 (c)(1), (2), (4) Date: Feb. 10, 2009

(87) PCT Pub. No.: WO2007/119794
PCT Pub. Date: Oct. 25, 2007

(65) Prior Publication Data
US 2009/0237787 A1    Sep. 24, 2009

(30) Foreign Application Priority Data

Apr. 14, 2006 (JP) .................. 2006-112252

(51) Int. Cl.
*C03C 3/11* (2006.01)

(52) U.S. Cl. .............. 501/56; 501/53; 502/232

(58) Field of Classification Search ............ 501/56, 501/53; 502/232
See application file for complete search history.

(56) References Cited

U.S. PATENT DOCUMENTS

| | | | |
|---|---|---|---|
| 5,840,096 A | 11/1998 | Tajima et al. | |
| 5,886,820 A | 3/1999 | Tajima et al. | |
| 6,313,947 B1 | 11/2001 | Takahashi et al. | |
| 6,777,359 B2 | 8/2004 | Yamashita et al. | |
| 2003/0064875 A1 | 4/2003 | Yamashita et al. | |

FOREIGN PATENT DOCUMENTS

| | | |
|---|---|---|
| CN | 1305966 A | 8/2001 |
| JP | 2740601 B2 | 1/1998 |
| JP | 2849358 B2 | 11/1998 |
| JP | 2000034132 A | 2/2000 |
| JP | 2003-098349 A | 4/2003 |
| JP | 2005-049529 A | 2/2005 |

OTHER PUBLICATIONS

Chinese Office Action corresponding to Chinese Patent Application No. 200780013133.0, dated Oct. 18, 2010.

*Primary Examiner* — Edward Johnson
(74) *Attorney, Agent, or Firm* — Sughrue Mion, PLLC

(57) ABSTRACT

To Provide a polarizing glass with better weatherability than conventional polarizing glasses, affording high long-term reliability without the above-described surface deterioration. To provide an optical isolator employing polarizing glass of improved weatherability, affording good weatherability and high reliability for extended periods.

A polarizing glass comprising geometrically anisotropic particles dispersed in an oriented manner in at least one surface layer of a glass base body. The glass base body does not comprise an oxide of alkali earth metal and PbO, and consists of borosilicate glass comprising at least one additive component selected from the group consisting of $Y_2O_3$, $ZrO_2$, $La_2O_3$, $CeO_2$, $Ce_2O_3$, $TiO_2$, $V_2O_5$, $Ta_2O_5$, $WO_3$, and $Nb_2O_5$, and the geometrically anisotropic metal particles are metallic cupper particles. An optical isolator employing the polarizing glass.

12 Claims, 1 Drawing Sheet

POLARIZING GLASS CONTAINING COPPER AND OPTICAL ISOLATOR

TECHNICAL FIELD

The present invention relates to polarizing glass containing copper and optical isolator. The optical isolators of this invention are utilized in optical communication using semiconductor lasers and optical fibers.

BACKGROUND OF THE INVENTION

Optical isolators are used to cut off the backward light caused by reflection to improve the S/N ratio in optical communication utilizing quartz optical fibers and semiconductor lasers at a wavelength of 1.31 micrometers or 1.55 micrometers as a light source. The optical isolators comprise a Faraday rotational element, two polarizers and a magnet, and it is necessary to reduce the size of each element to miniaturize the isolators. It is difficult, however, to miniaturize polarizers while maintaining its extinction ratio and environment resistance. For example, when using a birefringent crystal or light polarizing beam splitter, it is impossible to reduce its thickness less than an effective beam diameter. Further, when using a conventional light polarizing plate of a polymer type in the form of an elongated dichroic dye, it is possible to reduce its thickness but extinction ratio and environment resistance are insufficient.

Polarizing glasses in which metal microparticles having large aspect ratios are aligned are know as the polarizer satisfying the above requirements (see Japanese Patent Publication No. 27406014 (Patent Reference 1)). This polarizing glass comprises geometrically anisotropic metal particles dispersed in an oriented manner in at least one surface layer of a glass base body, wherein said glass base glass is selected from the group consisting of silicate, borate and borosilicate glasses, and the geometrically anisotropic metal particles are metallic copper particles.

[Patent Reference 1] Japanese Patent Publication No. 27406014
[Patent Reference 2] Japanese Patent Publication No. 2849358

DISCLOSURE OF THE INVENTION

Problems to be Solved by the Invention

The polarizing glass described in Patent Reference 1 has a high extinction ratio in the infrared region and can be employed in optical communication. Polarizers can be reduced in size using this polarizing glass and miniaturized isolators can be provided for optical communication.

Although the above polarizing glass did not present problems in a high-temperature, high-humidity test under conditions of 85° C. and 85 percent humidity up to 5,000 hours, the surface deteriorated slightly in a test conducted for a longer period. Weatherability through 5,000 hours under the above test conditions is adequate in ordinary use modes. However, there are cases where good weatherability for extended periods exceeding 5,000 hours is required. The polarizing glass is bonded to garnet film crystals and employed as an optical isolator. The possibility that small cracks might end up forming in the surface of the polarizing glass bonded to the garnet film was thought to exist when the strength of the glass was severely diminished by surface deterioration in the above long-term, high-temperature, high-humidity test. When such cracks formed, there was a risk that the polarization characteristics as an optical isolator could end up deteriorating.

Accordingly, an object of the present invention is to provide a polarizing glass with better weatherability than conventional polarizing glasses, affording high long-term reliability without the above-described surface deterioration. A further object of the present invention is to provide an optical isolator employing polarizing glass of improved weatherability, affording good weatherability and high reliability for extended periods.

The polarizing glass described in Patent Reference 1 is produced by elongating copper halide particles at a temperature within a range at which the glass exhibits a viscosity of $10^7$ to $10^{10}$ Pa·S, and employing a heat treatment in a reducing atmosphere to reduce the copper halide particles to obtain a polarizing glass containing elongated geometrically anisotropic metallic copper particles.

The patent reference proposes a method of drawing metal halide particle-containing glass as a method of improving the method of manufacturing polarizing glass containing the above geometrically anisotropic metallic copper particles. By this method, it is possible to prevent the return to sphere of extended spherical metal halide particles and polarizing glass having good polarizing characteristics is produced by both extending and cooling of the elongated glass in the course of drawing a glass preform in which metal halide particles are dispersed and efficiently cooling the elongated glass.

The polarizing characteristics of these polarizing glasses are such that the higher the aspect ratio of the elongated metal particles, the higher the extinction ratio in the 1.3 to 1.6 micrometer optical communication wavelength band. Further, the smaller the particle diameter of the metal halide particles serving as precursors of the elongated metal microparticles is, the lower the insertion loss becomes, yielding a high-performance polarizing glass. Elongating small diameter microparticles to obtain a polarizing glass having an elongated metal aspect ratio capable of delivering prescribed polarization characteristics requires that the elongation be conducted at relatively high tension.

However, to obtain high polarization characteristics in the course of heat elongation of the glass preform with the composition of the mother glass described in Patent References 1 and 2, when a tension exceeding a certain level is applied in drawing, the preform is unable to withstand the tension and breaks during the extending step. This greatly reduces the manufacturing yield. The yield reduction in the extending step increases the cost of manufacturing high-performance polarizing glass and bumps up the cost of optical isolators and the like employing polarizing glass as components.

Accordingly, a further object of the present invention is to provide a polarizing glass employing a glass base body that does not break during elongation of the preform, even when a certain high level of tension is applied for elongation in the course of elongating or drawing the glass preform. The object is also to lower the cost of manufacturing high-performance polarizing glass and provide an inexpensive high-performance optical isolator.

Means for Solution of the Problems

The present invention is as follows:
[1] A polarizing glass comprising geometrically anisotropic particles dispersed in an oriented manner in at least one surface layer of a glass base body, wherein the glass base body does not comprise an oxide of alkali earth metal and PbO, and consists of borosilicate glass comprising at least one additive component selected from the group consisting of $Y_2O_3$, $ZrO_2$, $La_2O_3$, $CeO_2$, $Ce_2O_3$, $TiO_2$, $V_2O_5$, $Ta_2O_5$, $WO_3$, and $Nb_2O_5$, and the geometrically anisotropic metal particles are metallic cupper particles.

[2] The polarizing glass comprising cupper according to [1], wherein the glass does not comprise an oxide of 2 valence metal other than SnO.

[3] The polarizing glass comprising cupper according to [1] or [2], wherein, expressed in terms of molar percent, the content of the additive component is in a range of 0.05-4% and the total content of the additive component is equal to or less than 6%.

[4] The polarizing glass comprising cupper according to [1] or [2], wherein the content of the additive component is in a range of 0.3-2% and the total content of the additive component is equal to or less than 3%.

[5] The polarizing glass according to any of [1] to [4], wherein the glass comprises, expressed in terms of weight %, of 48-65% $SiO_2$, 13-33% $B_2O_3$, 6-13% $Al_2O_3$, 0-5% $AlF_3$, 7-17% alkali metal oxide, 0-5% alkali metal chloride, 0.3-2.5% of a copper oxide and copper halide content, 0.01-0.6% SnO and 0-5% $As_2O_3$.

[6] The polarizing glass according to any of [1] to [5], wherein the metallic copper particles have aspect ratios in a range of from about 2:1 to 15:1.

[7] The polarizing glass according to any of [1] to [6], wherein the extinction ratio either for light having a wavelength of 1.31 micrometers or for light having a wavelength of 1.55 micrometers or both is 30 dB or more.

[8] The polarizing glass according to any of [1] to [7], wherein the metallic copper particles are 50 to 1,200 nm in length and 12 to 150 nm in width.

[9] The polarizing glass according to any of [1] to [8], wherein the glass base body has a softening point of 680° C. or higher.

[10] The polarizing glass according to [9], wherein the extinction ratio either for light having a wavelength of 1.31 micrometers or for light having a wavelength of 1.55 micrometers or both is 40 dB or more.

[11] An optical isolator employing the polarizing glass according to any of [1] to 10.

[12] An optical isolator comprising a Faraday rotational element and at least one polarizer as components and employing the polarizing glass according to any of [1] to [10] as said polarizer.

ADVANTAGES OF THE INVENTION

According to the present invention, provided is a polarizing glass of long-term high reliability that affords better weatherability than conventional polarizing glass, and does not undergo the above-described surface deterioration. According to the present invention, further provided is an optical isolator employing a polarizing glass with improved weatherability and long-term high reliability.

Furthermore, according to the present invention, achieved is elongation or drawing without breakage at a higher tension than that applied in the conventional manufacturing of glass by employing a glass base body with a melting point of 680° C. or higher. Elongation at high tension permits the elongation of microparticles of smaller diameter, providing a high-performance polarizing glass with polarizing glass characteristics in the form of a high extinction ratio and low insertion loss. The manufacturing of high-performance polarizing glass without an increase in cost makes it possible to provide an inexpensive high-performance optical isolator.

BEST MODE FOR CARRYING OUT THE INVENTION

The present invention relates to a polarizing glass comprising geometrically anisotropic particles dispersed in an oriented manner in at least one surface layer of a glass base body. In the polarizing glass of the present invention, the glass base body does not comprise an oxide of alkali earth metal and PbO, and consists of borosilicate glass comprising at least one additive component selected from the group consisting of $Y_2O_3$, $ZrO_2$, $La_2O_3$, $CeO_2$, $Ce_2O_3$, $TiO_2$, $V_2O_5$, $Ta_2O_5$, $WO_3$, and $Nb_2O_5$. In addition, the geometrically anisotropic metal particles are metallic cupper particles.

Generally, it is conceived that improving the weatherability of a borosilicate glass involves increasing the ratio of $SiO_2$ and $Al_2O_3$ components. However, when the ratio of $SiO_2$ and $Al_2O_3$ components is increased, the melting temperature of the glass tends to rise. An excessive rise in the glass melting temperature tends to cause halogen components to volatilize during melting of glass, creating a problem by compromising the deposition properties of CuCl when conducting a heat treatment to deposit CuCl. When the deposition properties of CuCl deteriorate, the formation of metallic metal particles by reduction of the deposited CuCl is inhibited. This results in a problem in that it becomes impossible to obtain polarizing glass having good polarization characteristics.

The glass constituting the glass base body of the polarizing glass of the present invention is a borosilicate glass. Borosilicate glasses contain $SiO_2$ and $B_2O_3$, and can also contain $Al_2O_3$ to enhance weatherability. The borosilicate glass constituting the glass base body of the present invention does not contain alkaline earth metal oxides or PbO.

The borosilicate glass constituting the glass base body of the present invention desirably contains no divalent metal oxide components (excluding SnO) such as alkaline earth metal oxides and PbO.

Generally, the incorporation of divalent metal oxide components such as alkaline earth metal oxides and PbO into a glass increases the basicity of the glass. Increasing the basicity of a glass serves to prevent the metal ions in the glass from becoming metals with a valence of zero.

However, in the copper halide-containing borosilicate glass employed in the present invention, as the basicity increases, the conversion of $Cu^+$ (monovalent) ions into metallic Cu (0 valence) is prevented, but the ratio of conversion to $Cu^{2+}$ (divalent) increases, and the glass assumes a deep blue color due to the $Cu^{2+}$. Thus, when manufacturing polarizing glass, this coloration creates a problem in the form of deterioration of insertion loss, an important characteristic in a polarizing glass.

When heat treating the above-described glass of high basicity, the divalent $Cu^{2+}$ is incorporated structurally into the glass and does not move about within the glass. The ratio of monovalent $Cu^+$ ions that are capable of movement reduces, and the quantity of CuCl microcrystals produced tends to diminish. That is, in a highly basic glass, there is a tendency for the ability of CuCl microcrystals to deposit to deteriorate.

For the above two reasons, no alkaline earth metal oxide or PbO is incorporated into the borosilicate glass employed in the present invention. Desirably, SnO aside, neither PbO nor any other divalent metal oxide component is incorporated.

SnO functions as a Cu ion-reducing agent. In the glass melt, SnO (divalent) has a strong tendency to convert to $SnO_2$ (tetravalent), so it has a reducing effect by scavenging oxygen from other metal oxides. In the glass melt, $Cu^+$ (monovalent) ions gradually convert to $Cu^{2+}$ (divalent) over time, but the addition of an extremely small quantity of SnO to the glass has the effect of inhibiting the tendency to become $Cu^{2+}$. The quantity of SnO incorporated is suitably adjusted based on the quantity of copper halide added, but generally falls within a range of 0.01 to 0.6 weight percent.

The incorporation of an extremely small quantity of SnO in the borosilicate glass employed in the present invention is desirable to keep the Cu ions monovalent and enhance CuCl deposition during heat treatment.

The borosilicate glass constituting the glass base body in the present invention further comprises at least one additive component selected from the group consisting of: $Y_2O_3$, $ZrO_2$, $La_2O_3$, $CeO_2$, $Ce_2O_3$, $TiO_2$, $V_2O_5$, $Ta_2O_5$, $WO_3$, and $Nb_2O_5$. The incorporation of this additive component has been discovered to enhance the weatherability of the glass and the heat-treated, phase-separated glass without greatly increasing the melting temperature of the glass.

These components have a function intermediate between that of glass forming oxides and that of glass modifying oxides in the glass structure. The incorporation of even small quantities is thought to serve to prevent glass corrosion by acid and water.

However, when these components are incorporated at a level exceeding 4 molar percent for a single component or 6 molar percent in total, the melting temperature rises to 200° C. or higher, halogen components volatilize in the melting, and the deposition of CuCl sometimes deteriorates. Accordingly, the content of these additive components, given as a molar percentage, ranges from 0.05 to 4 percent, and the total content of these additive components is desirably 6 percent or less.

Taking into account polarization characteristics, that is, the drop in the extinction ratio accompanying the decrease in deposition of CuCl microcrystals, the preferred upper limit of the content of these additive components, as a molar percentage, is 2 percent, and the upper limit of the total content of these components is desirably 3 percent. When the content of these components is less than 0.3 percent, the effect on increasing the weatherability of the glass decreases slightly, and at less than 0.05 percent, almost no effect on increasing weatherability is observed. Accordingly, the content of these additive components, given as a molar percentage, preferably falls within a range of 0.3 to 2 percent, and the total content of these additive components is preferably 3 percent or less.

The glass base body of the present invention desirably has a softening point of 680° C. or higher. Having a softening point of 680° C. or higher permits an increase in the heating temperature during elongation, permitting elongation at a temperature range of high viscosity, that is, elongation at high tension. Raising the softening point of the glass base body increases the mechanical strength of the glass, permitting drawing without damage such as breakage even when drawing is conducted at high tension. Drawing at high tension makes it possible to draw metal halide microparticles of smaller diameter to a prescribed aspect ratio, yielding a high-performance polarizing glass with a high extinction ratio and low insertion loss. Achieving a glass base body with a high melting point makes it possible to anticipate an effect in the form of higher weatherability when producing polarizing glass. In multicomponent glass compositions, it is known that the higher the glass transition temperature and softening point of a glass, the better the weatherability that is generally achieved. The softening point of the glass base body of the present invention is desirably 685° C. or higher, preferably 690° C. or higher, and more preferably, 700° C. or higher.

Incorporating the above additive components into the glass base body of the present invention results in a glass with a higher softening point than conventional glasses. As set forth above, these additive components serve to enhance the weatherability of the glass, as well as having the effect of raising the softening point. By employing a glass base body with a high softening point and controlling the manufacturing conditions, it is possible to obtain a high-performance polarizing glass with a high extinction ratio and low insertion loss.

The glass softening point is also referred to as the Littleton point at the temperature where the viscosity is $4.5 \times 10^7$ poise ($\log \eta (eta) = 7.65$). Known measurement methods include the fiber elongation method, which comprises applying a certain load to the extremity of a glass fiber and measuring the rate of elongation caused by heating; the beam bending method, which comprises measuring the change in deflection when heated with a load applied at the center of a square glass beam or round glass dowel supported horizontally at two points; the penetration method, which comprises measuring the rate of penetration of an indenter when a spherical, acicular, or rod-shaped indenter is pressed into a flat sample at a prescribed temperature; and the parallel plate method, which comprises placing a cylindrical sample between two parallel plates, raising the temperature, applying a certain load to the upper plate, and obtaining the rate of change in the distance between the plates (Glass Engineering Handbook, p. 74, Asakura Publishing Co., Ltd.). In the present invention, the parallel plate method, which is a simple, reliable method, is employed to measure the softening point.

The borosilicate glass constituting the glass base body in the present invention may be a glass comprising, expressed in terms of weight %, of 48-65% $SiO_2$, 13-33% $B_2O_3$, 6-13% $Al_2O_3$, 0-5% $AlF_3$, 7-17% alkali metal oxide, 0-5% alkali metal chloride, 0.3-2.5% of a copper oxide and copper halide content, 0.01-0.6% SnO and 0-5% $As_2O_3$.

The metallic copper particles contained in the polarizing glass of the invention are desirably those having aspect ratios in the range of from about 2:1 to 15:1. An aspect ratio is a ratio of length and breadth, with the length being the measurement of the longest side of the particle and the breadth being the measurement perpendicular to the length or the width. The aspect ratio is the factor which determines the absorbing wavelength of the lengthwise direction and the width direction of the metallic copper particles. In order to obtain metallic copper particles which exhibit good polarizing properties in the infrared region of a wavelength of from 1.3 to 1.55 micrometers, it is suitable that the aspect ratios of the particles ranges from 2:1 to 15:1. This is because the particles having an aspect ratio of less than 2:1 exhibit polarizing properties in the visible light region. On the other hand, particles exhibiting an aspect ratio of more than 15:1 demonstrate good polarizing properties in the mid-infrared region or in the far-infrared region. Glasses containing metallic copper particles exhibit polarizing properties, but those containing copper compounds other than metallic copper hardly exhibit polarizing properties. If glasses contain metallic copper, the presence of other copper compounds, such as copper halides, does not interfere to polarizing properties.

The geometrically anisotropic metallic copper particles contained in the polarizing glass of the present invention are desirably 50 to 1,200 nm in length and 12 to 150 nm in width. Achieving a metallic copper particle length of less than 50 nm or a width of less than 12 nm requires keeping the size of the copper halide particles that deposit to less than 50 nm, which in turn requires a large elongation force, tending to cause breakage during elongation. A length exceeding 1,200 nm results in a relatively broad width. When the width exceeds 150 nm, the insertion loss, an important characteristic of polarizing glass, ends up increasing. Thus, the above-stated ranges are desirable.

In order to prepare the glasses having the above composition, in addition to the above oxides, carbonates, nitrates, hydroxides, halides and the like may be used as starting materials. Since halides tend to vaporize during melting steps, it is preferred that the halides are added to the glass batch in a slight excess to the equivalent of copper. After melting of the glass batch, the resulting melt is cooled to room temperature to produce a glass containing copper and halogen.

The resultant glass is then heated to develop copper halide particles (for example, CuCl, CuF, CuBr, CuI or mixed crystals such as $CuF_{1-x}Cl_x$ (0<x<1). The heating is conducted at a temperature of preferably from 600-800° C. A longer period of time is required to develop copper halide particles at a temperature less than 600° C. At a temperature higher than 800° C., it is difficult to control the particle size of the copper halide by adjusting the period of heating time, since the rate at which the copper halide particles develop is too fast.

Copper halide particles of a larger particle size are more easily elongated, but tend to increase scattering loss in the obtained polarizing glass. Thus the particle size of the copper halide particles which develop in the glass suitably ranges from 50 to 300 nm, preferably from 50 to 200 nm, more preferably from 70 to 170 nm. When the particle size falls below the above-stated range, it becomes difficult to achieve a prescribed aspect ratio during drawing. As a result, it tends to become difficult to achieve light absorption at the wavelengths employed in optical communication. When the particle size exceeds the above-stated range, metal halides remaining within the glass following the manufacturing of a polarizing glass tend to have a significant effect in causing loss of transparency. The content of metal halides is desirably adjusted to a degree at which an adequate extinction rate, due to metal particles obtained by a prescribed reduction process, can be achieved and to a degree at which the effect on loss of transparency, due to metal halides present within the glass once a polarizing glass has been manufactured, does not become excessive. This adjustment can be achieved by suitably regulating the metals forming the halides and the quantity of halogens within the glass composition. In order to deposit the copper halide particles with the above mentioned particle size, it is suitable to heat at a temperature within the above mentioned range for a period of time ranging from 1-10 hrs, for example.

When heat-elongating a glass preform containing metal halide particles, metal halide microparticles that have deposited as spheres are elongated in a single direction into an elliptical or acicular shape having an aspect ratio. Normally, the heating temperature employed in this elongation step is one at which the glass exhibits a viscosity of $1\times10^8$ to $1\times10^{11}$ poises (Patent Reference 1) or a viscosity exceeding $2\times10^6$ poises to $7\times10^7$ poises (Patent Reference 2), with heat-elongation being conducted within a temperature range at which the glass substrate exhibits a viscosity of $4.5\times10^7$, which is in the vicinity of the softening point, or a somewhat lower temperature range. Based on the composition of the glass substrate, the heat-elongation temperature is suitably selected within the above glass viscosity range. Within this temperature range, the metal halide microparticles depositing into the glass substrate will be liquid, and can be readily elongated.

The heated glass is stretched at a temperature at which the glass containing the copper halide particles exhibits a viscosity of from $1\times10^7$ to $1\times10^{11}$ poises to elongate the copper halide particles. The reasons the viscosity of the glass is adjusted to between $1\times10^7$ and $1\times10^{11}$ poises are as follows. If the glass is heated to a temperature at which the glass demonstrates a viscosity of lower than $1\times10^7$ poises, the elongated particles tend to return to a spherical shape. If the glass is heated to a temperature at which the glass exhibits a viscosity of higher than $1\times10^{11}$ poises, the glass will tend to break during the stretching. The temperature at which the glass exhibits the above viscosity varies depending on the composition of the glass, and can easily be chosen.

The stretching of the glass is conducted to the extent that the aspect ratios of the copper halide particles fall within a range from 8:1 to 60:1. The copper halide particles with aspect ratios ranging from 8:1 to 60:1 are converted to metallic copper particles with aspect ratios ranging from about 2:1 to 15:1 by the subsequent reduction treatment. This is because the reduction of the copper halide particles to the metallic copper particles is accompanied by a volume shrinkage of about 70%. It is provided that the glass containing the copper halide particles having aspect ratios within the above range does not exhibit photochromic properties and hardly demonstrate polarizing properties.

The elongation of the copper halide particles can be carried out by stretching, extrusion, rolling or pressing of the glass containing the copper halide particles. The aspect ratios of the copper halide particles can be varied by changing the conditions of elongation. When the elongation is carried out by stretching, it is possible to control the shape of the resulted sample by varying the conditions of the stretching. It is possible to obtain a required tapered sample or a sample with a required constant width by varying the glass viscosity or stretching rate, or by moving the overheating zone of the glass.

The elongating load is varied by glass viscosity and elongating rate, and in the case where a glass is stretched, the elongating load can be adjusted to, for example, 20 MPa or more within the above temperature range. It is preferred that the elongated glass is rapidly cooled to a temperature lower than the annealing point of the glass in order to prevent copper halide particles from returning to a spherical shape.

In a desirable form of the present invention employing a glass base body having a softening point of 680° C. or higher, the heating temperature can be set high during elongation, permitting elongation at a temperature range of high viscosity, that is, elongation at high tension. Raising the softening point of the glass increases the mechanical strength of the glass, and permits drawing without damage such as breakage even when drawing at high tension. The softening points of the glass base bodies described in Patent References 1 and 2 are lower than 680° C. Thus, breakage occurs during heat elongation at high tension, bumping up the cost of manufacturing and essentially precluding stable manufacturing. The tension in the embodiments described in Patent Reference 2 is about 10 MPa. The level of tension causing breakage during elongation varies with the glass composition, but is about 25 MPa, for example. By contrast, in the present invention, suitable selection of the glass base body composition yields a glass base body with a softening point of 680° C. or higher, thereby permitting drawing without breakage even at a high tension of 30 MPa or greater. The softening temperature of the glass base body is desirably 700° C. or higher from the perspective of high tension drawing. Conducting drawing at a high tension of 30 MPa or greater makes it possible to draw metal halide microparticles of smaller diameter to a prescribed aspect ratio, yielding a high-performance optical glass with a high extinction ratio and low insertion loss.

In Patent References 1 and 2, the reason given for employing a polarizing glass of a mother glass with a relatively low softening point is that it permits melting due to a relatively low glass melting temperature, affording an advantage in terms of production equipment. In melting at temperatures of 1,500° C. and higher, metals imparting polarizing characteristics, such as Cu and Ag, tend to volatilize in the glass melt, making it difficult to obtain a polarizing glass of prescribed polarizing characteristics. However, although the glass containing the above-described additive components of the present invention has a melting temperature of 1,500° C. or lower, it is a glass having a relatively high softening point. As a result, the mechanical strength of the glass base body is increased, and elongation can be conducted without breakage even at high tension.

The elongated glass is then subjected to a reduction treatment to reduce a portion or all of the copper halide particles contained in the glass. It is preferred to polish the surface of the glass to form a desired shape in advance to the reduction treatment if necessary.

In order to obtain a glass exhibiting sufficient polarizing properties, it is necessary to reduce at least a portion of the elongated copper halide particles in the glass to metallic copper. The reduction is conducted by heating the glass in an atmosphere of, for example, hydrogen. The conditions of the reduction, especially the reduction temperature, is important since the reduction should be conducted while preventing the copper halide particles from returning to a spherical shape, and copper has three valences (0, 1 and 2). If the reduction temperature is relatively low, the metallic particles can be prevented from returning to a spherical shape, but a period of time is too long to form a reduced layer of a necessary thickness for obtaining good polarizing properties. If the reduction temperature is relatively high, it is possible to form a reduced layer of a necessary thickness, which exhibits good polarizing properties, for a short time, but the viscosity of the heated glass becomes too low not to return the metallic copper particles to a spherical shape. It is possible to elongate the copper halide particles into particles exhibiting greater aspect ratios than those exhibited by the particles to be reduced at a temperature at which the metallic copper particles can keep their prolated shapes, and reduce the particles with greater aspect ratios at a slightly high temperature at which the metallic particles gradually return to a spherical shape. Under these conditions, a reduced layer with sufficient thickness can be formed for a short period of time.

The reduction conditions are varied in accordance with the composition of the glass. The reduction treatment is generally conducted by reducing the glass at a temperature in the range of from 350 to 550° C., preferably from 375 to 475° C. for a period of time from 30 minutes to 10 hours, to obtain a glass with good polarizing properties. Under the above conditions, the copper halide particles at a distance of from about 1 to 120 micrometers from the surface of the glass are reduced. As a result, with respect to a relatively thin glass (a glass thinner than about 240 micrometers), almost all the copper halide particles therein are reduced to metallic copper to form a polarizing glass in which the resulting metallic copper particles are dispersed anisotropically. With respect to a relatively thick glass, the resulting metallic copper particles are dispersed anisotropically in the surface layers and unreduced copper halide particles are dispersed within the inner part of the glass. That is, the glass will have a three layer structure. Although the above explained reduction conditions are directed to reduction with hydrogen, reducing gases other than hydrogen can be employed, with the conditions being chosen properly. Examples of other reducing gases include $CO$—$CO_2$ gas.

The polarizing properties are varied with, in addition to the aspect ratios, a volume ratio and size of copper particles occupied within the glass, as well as, the thickness of the reduced layer. If the glass has an unreduced layer, the size and volume ratio of the copper halide particles in the unreduced layer, and thickness of the unreduced layer also influence the polarizing properties. The volume ratio of the copper particles is the product of the volume of one elongated copper particle observed by a transmission electron microscope and the density of the particle (the number in a unit volume). The volume ratio of copper particles influences the absorption coefficient. A volume ratio of less than $6 \times 10^{-5}$ is too small, and therefore a thick reduction layer is required to provide sufficient polarizing properties and a longer time is required for reduction. On the other hand, a volume ratio of more than $1 \times 10^{-2}$ is generally too large, and scattering resulting from the copper halide particles in the unreduced layer increases to result in undesirable scattering loss even though the reduced layer can be thin. The content of copper halide particles influences the volume ratio of copper particles and is varied by the heat treatment conditions, and suitably ranges from 0.3 to 2.5 weight %.

The polarizing glass of the present invention comprises geometrically anisotropic particles that are dispersed in an oriented manner in the outer layer of at least one of the main surfaces of the glass base body. It is desirable to incorporate geometrically anisotropic particles that are dispersed in an oriented manner in the outer layer of two main surfaces of the glass base body. The term "main surface" of the glass base body means the two widest opposing surfaces among the surfaces of a tabular glass base body. However, when the glass base body is an angular or round column, the "main surfaces" of the glass base body refer to the lateral surfaces (top and bottom surfaces excluded) of the angular or round column.

The polarizing glasses containing copper of the present invention do not exhibit photochromic properties. In addition, the glasses demonstrate 30 dB or more of extinction ratio by irradiation of light having a wavelength of 1.3-1.55 micrometers without irradiation of light with a short wavelength since at least a part of the copper halide has been reduced to metallic copper. The absorption of the polarizing glass of the present invention is relatively broad and therefore, the glasses exhibit good polarizing properties both at 1.31 micrometers and at 1.55 micrometers, which wavelengths are used in the optical communication.

Since the present invention relates to a polarizing glass which transmits linear polarizing light with only one direction, polarization will be explained below. Linear polarizing light is the light which has an electrical field vector directed in one direction. Ordinary light is assumed to consist of two perpendicular components. When a glass contains fine metallic particles having an anisotropic shape, absorption of light component of which direction of electrical field is parallel to the short axis of the metallic particles is different from that of component, of which direction is parallel to the long axis. The absorbance of components parallel to the long axis and the short axis can be measured separately by a spectrophotometer. The differences in absorbance between components parallel to the short axis (light of width) and the long axis (light of length) result in a polarizer which transmits one of linear polarized light.

An optical isolator of the present invention comprises, as construction parts, a Faraday rotational element and at least one polarizer, which preferably comprises, as construction parts, a Faraday rotational element, two polarizers and at least one magnet, wherein the copper containing polarizing glass of the present invention is used as the polarizer.

EXAMPLE

The present invention will be set for in detail below.

Example 1

A glass batch having the composition shown in Table 1 as sample (1) was prepared from $SiO_2$, $H_3BO_3$, $Al(OH)_3$, $Na_2CO_3$, NaCl, $AlF_3$, CuCl, SnO, etc, and is heated to 1450° C. (to melt) in a platinum crucible (5 liters). The melted glass was poured into a cast-iron mold to form a glass and was cooled gradually to room temperature. The resulting glass was heated at 800° C. for 3 hrs to deposit CuCl particles of a size of about 100 nm in diameter in the glass. This glass did not exhibit photochromic properties. The softening point of the glass was 687° C. as measured by the parallel plate method (employing a glass parallel plate compression viscometer made by Opto Corp.). The glass disk was cut to obtain a plate (3.5×80×300 mm). The plate was heated to 650° C., at which temperature the glass exhibits a viscosity of about $1\times10^8$ poise, and was stretched at the rate of 400 mm/min under a load of 25.0 MPa. As a result, the CuCl particles are elongated into a shape of about 40×600 nm (aspect ratio: 15:1) and are aligned in the glass. The particle density of CuCl in the resulting glass was estimated as $2.5\times10^{12}/cm^3$ by observation using a transmission electron microscope. The volume ratio of CuCl particles was calculated to be about $4.4\times10^{-3}$.

The resulting glass plate was polished to form a plate of about 0.2 mm thickness and was reduced in a hydrogen atmosphere at 450° C. for 6 hr to obtain a glass with polarizing properties. The thickness of reduced surface layer of the glass was about 30 micrometers. The CuCl particles were changed by the reduction to metallic copper particles exhibiting aspect ratios of about 2-7 (metallic copper particles being averagely about 35×175 nm in size (an aspect ratio of about 5:1)). Vacancies resulted from the shrinkage accompanying the reduction.

The extinction ratio and insertion loss which are values obtained by measurement of glass samples 0.2 mm in thickness having an anti-reflection coating to both surfaces are shown in Table 1. The extinction ratio of the polarizing glass was obtained by creating a parallel beam of light with a fiber collimator from semiconductor laser beams of various wavelengths, directing this beam via a phase compensator and Grant Thomson prism perpendicularly into the polarizing glass being measured, rotating the polarizing glass within a plane perpendicular to the optical axis, first measuring the minimum transmitted light intensity $P_1$, rotating the polarizing glass 90 degree and measuring the maximum transmitted light intensity $P_2$, and employing Equation (1) below. The loss was obtained by measuring the light intensity $P_0$ in the absence of polarizing glass and employing Equation (2) below.

$$\text{Extinction ratio (dB)} = -10\ \text{Log}(P_1/P_2) \quad (1)$$

$$\text{Loss (dB)} = -10\ \text{Log}(P_2/P_0) \quad (2)$$

When this polarizing glass is employed in an optical communication optical isolator, it is necessary to minimize Fresnel reflection on the surface. Thus, a reflection-reducing film is normally formed on the polarizing glass. An $SiO_2/TiO_2/SiO_2$ three-layered reflection-reducing film the thickness of which was designed to minimize reflectance at each of the wavelengths employed was formed on polarizing glass of the present embodiment. The reflectance was 0.1-0.2 percent on both surfaces.

Weatherability Test of Polarizing Glass

A piece of polarizing glass 0.2 mm in thickness and 10 mm square (with no AR film on either surface), produced as set forth above, was placed within a Teflon sample holder. This was then introduced into a thermohygrostat tester (model PR-2FPW) made by Tabai Espec Corp.), and maintained for 7,000 hours at a temperature of 85° C. and a humidity of 85 percent.

Subsequently, the state of the surface of the polarizing glass was examined at 30-fold magnification with a Nikon stereo microscope (SMZ-2T). The polarizing glasses of the embodiments were compared employing the degree of deposition present within the surface and the surface roughness of the polarizing glasses of the Examples as a standard. The state of the comparative example was denoted as B. A state of little deposition or surface roughness was evaluated as A, and considerable deposition as C. A state between B and A was evaluated as BA, and a state better than A as AA. The evaluation was conducted visually. A yardstick whereby A denoted a state of approximately half the deposition and roughness of B, C denoted a state of about twice that of B, and AA denoted a state of approximately ¼ that of B was employed.

Examples 2-14

Polarizing glasses having the compositions shown in Table 1 as sample Nos. 2-14 were prepared in accordance with the same procedures as those of Example 1. The extinction ratio and insertion loss and weatherability were tested. The results are shown in Table 1. Softening temperatures are also shown in Table 1.

Comparative Example 1

Polarizing glass having the compositions shown in Table 1 as Comparative example 1 was prepared in accordance with the same procedures as those of Example 1. The extinction ratio and insertion loss and weatherability were tested. The results are shown in Table 1.

TABLE 1

|  | Comparative example | | No. 1 | | No. 2 | | No. 3 | | No. 4 | |
| --- | --- | --- | --- | --- | --- | --- | --- | --- | --- | --- |
|  | mol % | wt % | mol % | wt % | mol % | wt % | mol % | wt % | mol % | wt % |
| $SiO_2$ | 63.08 | 58.7 | 63.08 | 57.3 | 63.08 | 58.2 | 63.08 | 56.5 | 63.08 | 57.8 |
| $AlF_3$ | 1.69 | 2.2 | 1.69 | 2.1 | 1.69 | 2.1 | 1.69 | 2.1 | 1.69 | 2.2 |
| $Al_2O_3$ | 4.43 | 7.0 | 4.43 | 6.8 | 4.43 | 6.9 | 4.43 | 6.7 | 4.43 | 6.9 |
| $B_2O_3$ | 19.01 | 20.5 | 18.01 | 19.0 | 18.01 | 19.3 | 18.01 | 18.7 | 18.01 | 19.1 |
| NaCl | 1.11 | 1.0 | 1.11 | 1.0 | 1.11 | 1.0 | 1.11 | 1.0 | 1.11 | 1.0 |
| $Na_2O$ | 10.11 | 9.7 | 10.11 | 9.5 | 10.11 | 9.6 | 10.11 | 9.3 | 10.11 | 9.6 |
| $Y_2O_3$ |  |  | 1.00 | 3.4 |  |  |  |  |  |  |

TABLE 1-continued

|  | No. 1 mol % | wt % | No. 2 mol % | wt % | No. 3 mol % | wt % | No. 4 mol % | wt % | (cont) mol % | wt % |
|---|---|---|---|---|---|---|---|---|---|---|
| $ZrO_2$ | | | 1.00 | 1.9 | | | | | | |
| $La_2O_3$ | | | | | 1.00 | 4.9 | | | | |
| $CeO_2$ | | | | | | | 1.00 | 2.6 | | |
| $TiO_2$ | | | | | | | | | | |
| $V_2O_5$ | | | | | | | | | | |
| $Ta_2O_5$ | | | | | | | | | | |
| $WO_3$ | | | | | | | | | | |
| $Nb_2O_5$ | | | | | | | | | | |
| CuCl | 0.52 | 0.8 | 0.52 | 0.8 | 0.52 | 0.8 | 0.52 | 0.8 | 0.52 | 0.8 |
| SnO | 0.05 | 0.1 | 0.05 | 0.1 | 0.05 | 0.1 | 0.05 | 0.1 | 0.05 | 0.1 |
| Softening temperature | 670° C. | | 687° C. | | 678° C. | | 682° C. | | 675° C. | |
| Extinction ratio | | | | | | | | | | |
| 1.31 μm | 50 dB | | 51 dB | | 53 dB | | 54 dB | | 52 dB | |
| 1.55 μm | 54 dB | | 55 dB | | 50 dB | | 51 dB | | 51 dB | |
| Insertion loss | | | | | | | | | | |
| 1.31 μm | 0.04 dB | | 0.04 dB | | 0.04 dB | | 0.04 dB | | 0.04 dB | |
| 1.55 μm | 0.04 dB | | 0.03 dB | | 0.04 dB | | 0.04 dB | | 0.04 dB | |
| Weatherability | B | | A | | A | | A | | BA | |

|  | No. 5 mol % | wt % | No. 6 mol % | wt % | No. 7 mol % | wt % | No. 8 mol % | wt % | No. 9 mol % | wt % |
|---|---|---|---|---|---|---|---|---|---|---|
| $SiO_2$ | 63.08 | 58.6 | 63.08 | 57.7 | 63.08 | 55.5 | 63.08 | 57.3 | 63.08 | 57.0 |
| $AlF_3$ | 1.69 | 2.2 | 1.69 | 2.2 | 1.69 | 2.1 | 1.69 | 2.1 | 1.69 | 2.1 |
| $Al_2O_3$ | 4.43 | 7.0 | 4.43 | 6.9 | 4.43 | 6.6 | 4.43 | 6.8 | 4.43 | 6.8 |
| $B_2O_3$ | 18.01 | 19.4 | 18.01 | 19.1 | 18.01 | 18.4 | 18.01 | 18.9 | 18.01 | 18.8 |
| NaCl | 1.11 | 1.0 | 1.11 | 1.0 | 1.11 | 0.9 | 1.11 | 1.0 | 1.11 | 1.0 |
| $Na_2O$ | 10.11 | 9.7 | 10.11 | 9.5 | 10.11 | 9.2 | 10.11 | 9.5 | 10.11 | 9.4 |
| $Y_2O_3$ | | | | | | | | | | |
| $ZrO_2$ | | | | | | | | | | |
| $La_2O_3$ | | | | | | | | | | |
| $CeO_2$ | | | | | | | | | | |
| $TiO_2$ | 1.00 | 1.2 | | | | | | | | |
| $V_2O_5$ | | | 1.00 | 2.8 | | | | | | |
| $Ta_2O_5$ | | | | | 1.00 | 6.5 | | | | |
| $WO_3$ | | | | | | | 1.00 | 3.5 | | |
| $Nb_2O_5$ | | | | | | | | | 1.00 | 4.0 |
| CuCl | 0.52 | 0.8 | 0.52 | 0.8 | 0.52 | 0.8 | 0.52 | 0.8 | 0.52 | 0.8 |
| SnO | 0.05 | 0.1 | 0.05 | 0.1 | 0.05 | 0.1 | 0.05 | 0.1 | 0.05 | 0.1 |
| Softening temperature | 678° C. | | 670° C. | | 665° C. | | 682° C. | | 684° C. | |
| Extinction ratio | | | | | | | | | | |
| 1.31 μm | 50 dB | | 50 dB | | 54 dB | | 50 dB | | 51 dB | |
| 1.55 μm | 53 dB | | 50 dB | | 51 dB | | 52 dB | | 55 dB | |
| Insertion loss | | | | | | | | | | |
| 1.31 μm | 0.04 dB | | 0.05 dB | | 0.04 dB | | 0.05 dB | | 0.04 dB | |
| 1.55 μm | 0.03 dB | | 0.04 dB | | 0.03 dB | | 0.04 dB | | 0.03 dB | |
| Weatherability | A | | A | | A | | A | | A | |

|  | No. 10 mol % | wt % | No. 11 mol % | wt % | No. 12 mol % | wt % | No. 13 mol % | wt % | No. 14 mol % | wt % |
|---|---|---|---|---|---|---|---|---|---|---|
| $SiO_2$ | 63.08 | 58.6 | 63.08 | 58.3 | 63.08 | 56.0 | 63.08 | 53.5 | 63.08 | 54.3 |
| $AlF_3$ | 1.69 | 2.2 | 1.69 | 2.2 | 1.69 | 2.1 | 1.69 | 2.0 | 1.69 | 2.0 |
| $Al_2O_3$ | 4.43 | 7.0 | 4.43 | 6.9 | 4.43 | 6.7 | 4.43 | 6.4 | 4.43 | 6.5 |
| $B_2O_3$ | 18.96 | 20.4 | 18.71 | 20.0 | 17.01 | 17.5 | 15.01 | 14.8 | 16.01 | 16.0 |
| NaCl | 1.11 | 1.0 | 1.11 | 1.0 | 1.11 | 1.0 | 1.11 | 0.9 | 1.11 | 0.9 |
| $Na_2O$ | 10.11 | 9.7 | 10.11 | 9.6 | 10.11 | 9.3 | 10.11 | 8.8 | 10.11 | 9.0 |
| $Y_2O_3$ | 0.05 | 0.2 | 0.30 | 1.0 | 2.00 | 6.7 | 4.00 | 12.8 | 1.50 | 4.9 |
| $ZrO_2$ | | | | | | | | | | |
| $La_2O_3$ | | | | | | | | | | |
| $CeO_2$ | | | | | | | | | | |
| $TiO_2$ | | | | | | | | | | |
| $V_2O_5$ | | | | | | | | | | |
| $Ta_2O_5$ | | | | | | | | | | |
| $WO_3$ | | | | | | | | | | |
| $Nb_2O_5$ | | | | | | | | | 1.50 | 5.7 |
| CuCl | 0.52 | 0.8 | 0.52 | 0.8 | 0.52 | 0.8 | 0.52 | 0.7 | 0.52 | 0.7 |
| SnO | 0.05 | 0.1 | 0.05 | 0.1 | 0.05 | 0.1 | 0.05 | 0.1 | 0.05 | 0.1 |

TABLE 1-continued

| | | | | | |
|---|---|---|---|---|---|
| Softening temperature | 673° C. | 677° C. | 698° C. | 710° C. | 701° C. |
| Extinction ratio | | | | | |
| 1.31 μm | 51 dB | 51 dB | 48 dB | 43 dB | 46 dB |
| 1.55 μm | 53 dB | 54 dB | 52 dB | 46 dB | 51 dB |
| Insertion loss | | | | | |
| 1.31 μm | 0.04 dB | 0.04 dB | 0.03 dB | 0.03 dB | 0.03 dB |
| 1.55 μm | 0.04 dB | 0.03 dB | 0.03 dB | 0.03 dB | 0.03 dB |
| Weatherability | BA | A | AA | AA | AA |

As shown in Table 1, polarizing glasses of the present invention exhibited excellent extinction ratio and insertion loss comparable with the conventional polarizing glass shown as Comparative example 1 and exhibited superior weatherability than the conventional polarizing glass shown as Comparative example 1.

Example 15

In accordance with the procedures of Example 1, a glass containing CuCl particles was prepared, was elongated and was polished to form a glass plate having a thickness of 0.1 mm followed by a reduction treatment whereby a polarizing glass of the present invention was obtained. FIG. 1 shows an isolator of the present invention comprising the resulting polarizers 11 and 12, Faraday rotating garnet membrane 13 prepared by the liquid phase epitaxial method, commercially available from Tokin CO. LTD. in Japan and Sm—Co magnets 14a and 14b were assembled. The thickness of the polarizers 11 and 12 was 0.1 mm and that of Faraday rotating garnet membrane 13 was about 0.4 mm. They were adhered with an adhesive. The extinction ratio of the isolator for light having a wavelength of 1.3 micrometers was 30 dB.

Example 16

In accordance with the procedures of Example 15, except for employing a Faraday rotating garnet membrane 13 with 0.45 mm in thickness, an optical isolator for a wavelength of 1.55 micrometers was assembled by in accordance with the same procedures of Example 15. The extinction ratio resulting from the isolator was 32 dB.

Example 17

(1) Formation of Preform

A glass having the composition of $SiO_2$ 57.8%, $AlF_3$ 2.3%, $Al_2O_3$ 6.8%, $B_2O_3$ 19.0%, $Na_2O$ 9.0%, NaCl 1%, $Y_2O_3$ 3.5%, CuCl 0.5%, SnO 0.1% was melted by heating to 1450° C. in a platinum crucible (5 liters). The melted glass was poured into a mold and was annealed at 510° C. to form a glass block. The softening point of the glass was 689° C. as measured by the parallel plate method (employing a glass parallel plate compression viscometer made by Opto Corp.). The glass block was cut to suitable size and heat treated at 720° C. for 5 hours, yielding a glass containing copper chloride particles about 80 nm in average particle size within the glass block. (These were observed in photographs taken by transmission electron microscopy (TEM).) The glass was processed to obtain a tabular preform measuring 100×300×3.5 mm with optically polished surfaces on two sides.

(2) The Elongation Step

The above preform was immersed in an aqueous solution containing 5 percent hydrofluoric acid, etched for 10 minutes, and elongated with heating in a drawing device. The temperature within the heating furnace was set to 650° C. Once the temperature stabilized, preforms were conveyed at 13 mm/minute by a preform feeder, tension was simultaneously applied by rollers, and sheet glass was continuously drawn at a drawing rate of 40 cm/minute. The temperature of the heating furnace was gradually lowered, and set to the vicinity of about 640° C. The glass sheet obtained measured 18.0 mm in width and 0.63 mm in thickness. The tensile stress was gradually increased, but no breaking occurred even when 31.5 MPa was reached. The copper chloride particles were observed in photographs taken by transmission electron microscopy (TEM), revealing that they had changed shape to about 35×630 nm (aspect ratio of 18:1) and were approximately aligned in a single direction.

(3) Reduction

The glass was ground to a thickness of about 0.2 mm and reduced at 450° C. for 6 hours in hydrogen gas to obtain a glass exhibiting polarization characteristics. The thickness of the reduced layer within the glass was about 30 micrometers. The reduction changed the copper chloride particles to copper particles with an aspect ratio of about 3 to 9 (on average, copper particles of about 30×180 nm (aspect ratio 6:1)) having pits caused by the volumetric shrinkage accompanying reduction.

(4) Measurement of Optical Characteristics

Table 2 gives measurement values for the extinction ratio and insertion loss when two surfaces were coated with a 0.2 mm antireflective coating. The measurement system was identical to that in Example 1 above.

(5) Fabrication of an Optical Isolator

Two pieces of the polarizing glass prepared as set forth above were bonded to a commercial garnet film (made by Tokin) with their axes of polarization inclined by 45 degrees as shown in FIG. 1 and an Sm—Co magnet was combined to prepare an optical isolator. The extinction ratio of the optical isolator at a wavelength of 1.55 micrometers was 35 dB.

Comparative Example 2

(1) Formation of Preform

A glass having the composition of $SiO_2$ 59.7%, $AlF_3$ 2.1%, $Al_2O_3$ 6.9%, $B_2O_3$ 20.2%, $Na_2O$ 9.5%, NaCl 1%, CuCl 0.5%, SnO 0.1% (not containing $Y_2O_3$) by heating to 1410° C. in a platinum crucible (5 liters). The melted glass was poured into a mold and was annealed at 470° C. to form a glass block. The softening point of the glass was 672° C. as measured by the parallel plate method the same as Example 1. The glass block was cut to suitable size and heat treated at 700° C. for 5 hours, yielding a glass containing copper chloride particles about 95 nm in average particle size within the glass block. The glass was processed to obtain a tabular preform measuring 100× 300×3.5 mmt with optically polished surfaces on two sides.

(2) The Elongation Step

The drawing was conducted in the same manner as in Example 1 excepting for that the above preform was etched, the initial temperature within the heating furnace was set to 635° C., and the temperature during the drawing was set to about 625° C. The tensile stress was gradually increased and the drawn sheet was cut at around the lower end of the drawing machine when reached 24.7 MPa. Right after that, the drawn glass sheet had a crack and a part of the broken sheet was broken.

(3) Measurement of Optical Characteristics

An unbroken glass sheet was polished, reduced, and coated with an AR coating in the same manner as in Example 17, and its optical characteristics were measured. The results are given in Table 2.

(4) Fabrication of an Optical Isolation

An optical isolator was fabricated in the same manner as in Example 17 from polarizing glass obtained as set forth above. The extinction ratio of the optical isolator at a wavelength of 1.55 micrometers was low, 25 dB.

[Table 2]

TABLE 2

| | Extinction ratio (dB) | | Insertion loss (dB) | |
|---|---|---|---|---|
| | 1.31 micrometers | 1.55 micrometers | 1.31 micrometers | 1.55 micrometers |
| Example 17 | 55 | 61 | 0.035 | 0.025 |
| Comparative example 2 | 38 | 43 | 0.060 | 0.055 |

INDUSTRIAL APPLICABILITY

The present invention is useful in the manufacturing field of isolators.

Figure 1:
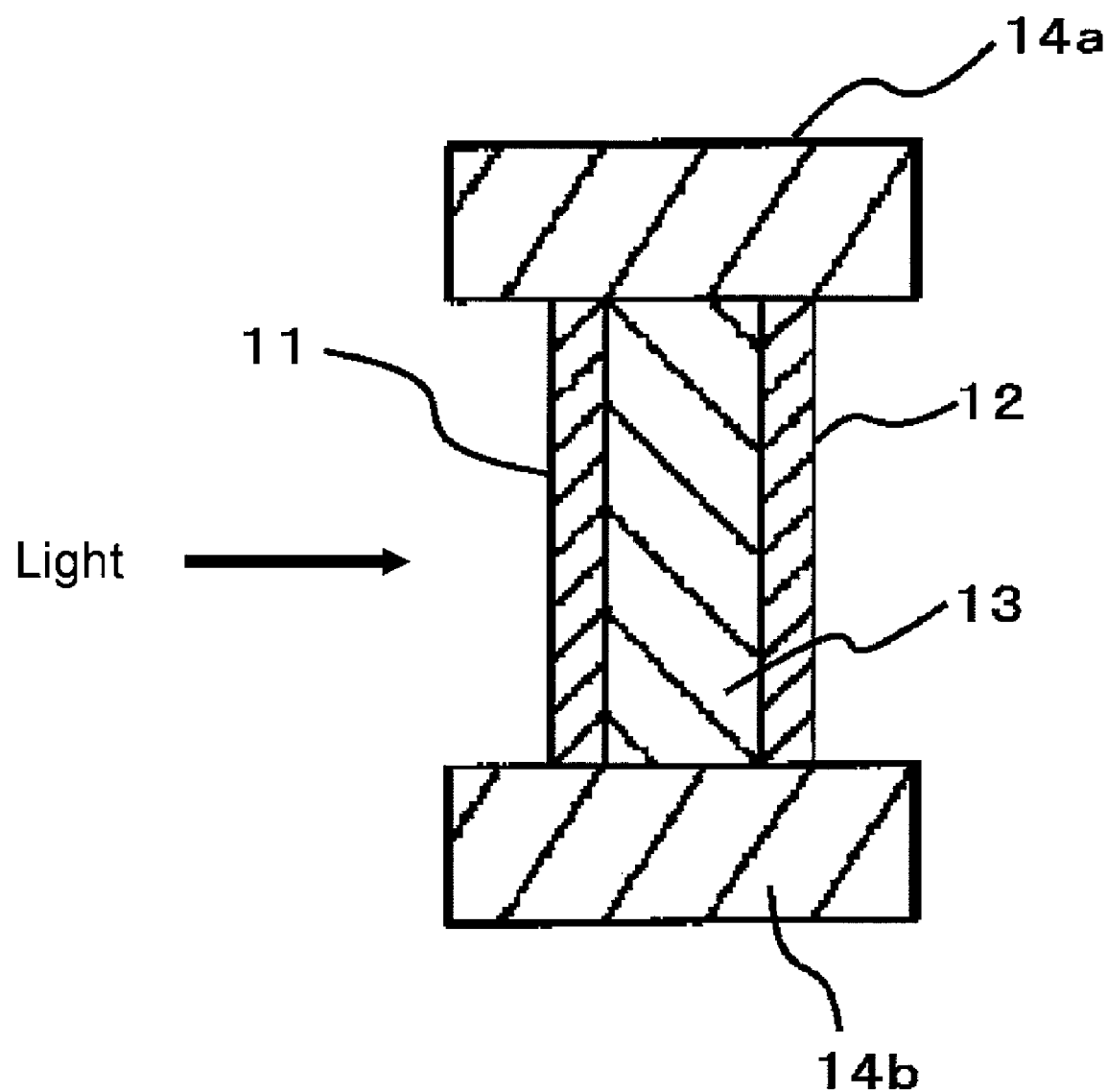
FIG. 1 is an explanatory FIGURE of the isolator comprising polarizers 11 and 12 employing the polarizing glass of the present invention, commercially available magnetic garnet membrane 13 (Tokin) and Sm—Co based magnets 14a and 14b.

What is claimed is:

1. A polarizing glass comprising geometrically anisotropic particles dispersed in an oriented manner in at least one surface layer of a glass base body, wherein the glass base body does not comprise an oxide of alkali earth metal and PbO, and consists of borosilicate glass comprising at least one additive component selected from the group consisting of $Y_2O_3$, $La_2O_3$, $CeO_2$, $Ce_2O_3$, $WO_3$, and $Nb_2O_5$, and the geometrically anisotropic metal particles are metallic cupper particles.

2. The polarizing glass comprising cupper according to claim 1, wherein the glass does not comprise an oxide of 2 valence metal other than SnO.

3. The polarizing glass comprising cupper according to claim 1, wherein, expressed in terms of molar percent, the content of the additive component is in a range of 0.05-4% and the total content of the additive component is equal to or less than 6%.

4. The polarizing glass comprising cupper according to claim 1, wherein the content of the additive component is in a range of 0.3-2% and the total content of the additive component is equal to or less than 3%.

5. The polarizing glass according to claim 1, wherein the glass comprises, expressed in terms of weight %, of 48-65% $SiO_2$, 13-33% $B_2O_3$, 6-13% $Al_2O_3$, 0-5% $AlF_3$, 7-17% alkali metal oxide, 0-5% alkali metal chloride, 0.3-2.5% of a copper oxide and copper halide content, 0.01-0.6% SnO and 0-5% $As_2O_3$.

6. The polarizing glass according to claim 1, wherein the metallic copper particles have aspect ratios in a range of from about 2:1 to 15:1.

7. The polarizing glass according to claim 1, wherein the extinction ratio either for light having a wavelength of 1.31 micrometers or for light having a wavelength of 1.55 micrometers or both is 30 dB or more.

8. The polarizing glass according to claim 1, wherein the metallic copper particles are 50 to 1,200 nm in length and 12 to 150 nm in width.

9. The polarizing glass according to claim 1, wherein the glass base body has a softening point of 680° C. or higher.

10. The polarizing glass according to claim 9, wherein the extinction ratio either for light having a wavelength of 1.31 micrometers or for light having a wavelength of 1.55 micrometers or both is 40 dB or more.

11. An optical isolator employing the polarizing glass according to claim 1.

12. An optical isolator comprising a Faraday rotational element and at least one polarizer as components and employing the polarizing glass according to claim 1 as said polarizer.

\* \* \* \* \*